United States Patent
Jin

(10) Patent No.: US 11,289,932 B2
(45) Date of Patent: Mar. 29, 2022

(54) BATTERY PACK AND ELECTRONIC DEVICE INCLUDING THE SAME

(71) Applicant: Samsung SDI Co., Ltd., Yongin-si (KR)

(72) Inventor: Kyongpil Jin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 84 days.

(21) Appl. No.: 16/727,289

(22) Filed: Dec. 26, 2019

(65) Prior Publication Data
US 2020/0203957 A1 Jun. 25, 2020

(30) Foreign Application Priority Data
Dec. 24, 2018 (KR) .................. 10-2018-0168459

(51) Int. Cl.
*H02J 7/00* (2006.01)
(52) U.S. Cl.
CPC ............ *H02J 7/007* (2013.01); *H02J 7/0031* (2013.01); *H02J 7/0036* (2013.01)
(58) Field of Classification Search
CPC .. H02J 50/12; H02J 7/025; H02J 50/70; H02J 50/90; H02J 50/60; H02J 50/50; H02J 50/80; H02J 5/005; H02J 50/40; H02J 7/35; H02J 7/0029; H02J 7/045; H02J 7/00045; H02J 9/02; H02J 7/00304; H02J 7/00034; H02J 7/0047; H02J 7/00714; H02J 7/0024; H02J 7/007; H02J 5/00; H02J 7/0013; H02J 7/0022; H02J 7/0045; H02J 7/02;
(Continued)

(56) References Cited

U.S. PATENT DOCUMENTS 8,421,417 B2 4/2013 Kim et al.
8,994,331 B2 3/2015 Kerfoot, Jr. et al.
(Continued)

FOREIGN PATENT DOCUMENTS

KR          10-1030885 B1    4/2011
KR          10-1182430 B1    9/2012
KR     10-2015-0127779 A    11/2015

OTHER PUBLICATIONS

EPO Extended Search report dated Mar. 6, 2020, for corresponding European Patent Application No. 19219420.7 (8 pages).

*Primary Examiner* — Binh C Tat
(74) *Attorney, Agent, or Firm* — Lewis Roca Rothgerber Christie LLP

(57) ABSTRACT

A battery pack having separate charging and discharging paths includes a battery including at least one battery cell, a processor configured to monitor the battery and to control charging and discharging operations of the battery, a charging switch arranged along at least one of a first path electrically connecting a first pole of the battery to a charging device and a third path electrically connecting a second pole of the battery to the charging device, the charging switch being configured to operate according to a control signal generated by the processor, and a discharging switch arranged along at least one of a second path electrically connecting the first pole of the battery to a load and a fourth path electrically connecting the second pole of the battery to the load, the discharging switch being configured to operate according to the control signal generated by the processor.

16 Claims, 5 Drawing Sheets

(58) Field of Classification Search
CPC ...... H02J 7/022; H02J 7/36; H02J 7/34; H02J 50/20; H02J 50/005; H02J 9/065; H02J 50/402; H02J 50/10; H02J 7/00; H02J 2310/40; H02J 7/04; H02J 2300/28; H02J 50/05; H02J 7/00309; H02J 50/502; H02J 7/0042; H02J 7/0068; H02J 7/345; H02J 9/061; H02J 13/00006; H02J 13/00017; H02J 13/0017; H02J 2310/48; H02J 7/00306; H02J 50/00; H02J 50/001; H02J 50/30; H02J 7/00308; H02J 50/15; H02J 7/0048; H02J 7/007182; H02J 3/00; H02J 3/322; H02J 3/32; H02J 7/0027; H02J 7/0044; H02J 13/00004; H02J 2207/40; H02J 2300/24; H02J 2310/14; H02J 3/0075; H02J 3/14; H02J 3/383; H02J 50/23; H02J 7/00302; H02J 7/0031; H02J 7/0036; H02J 9/06; H01M 10/441; H01M 50/296; H01M 10/4207; Y04S 40/12

USPC .................................................. 320/126–136
See application file for complete search history.

(56) References Cited

U.S. PATENT DOCUMENTS

| | | |
|---|---|---|
| 9,130,383 B2 | 9/2015 | Mukai et al. |
| 9,479,002 B2 | 10/2016 | An et al. |
| 2012/0126749 A1 | 5/2012 | Kim |
| 2013/0099747 A1* | 4/2013 | Baba ............... H02J 7/0014 320/118 |
| 2015/0295448 A1 | 10/2015 | Sugeno et al. |
| 2015/0333666 A1* | 11/2015 | Miller ............... B25F 5/00 318/139 |
| 2016/0049810 A1* | 2/2016 | Armstrong, II ....... H02J 7/0014 320/118 |

\* cited by examiner

BATTERY PACK AND ELECTRONIC DEVICE INCLUDING THE SAME

CROSS-REFERENCE TO RELATED APPLICATION

This application claims priority to and the benefit of Korean Patent Application No. 10-2018-0168459, filed on Dec. 24, 2018, in the Korean Intellectual Property Office, the disclosure of which is incorporated herein in its entirety by reference.

BACKGROUND

1. Field

Aspects of the present disclosure relate to a battery pack and an electronic device including the battery pack.

2. Description of Related Art

With the development of portable electronic devices, such as cellular phones, laptop computers, camcorders, personal digital assistants (PDAs), and tablets, and electric transportation modes, such as electric vehicles, secondary batteries (rechargeable batteries) which can be repeatedly charged and discharged have been actively researched and developed.

Such a secondary battery may constitute a battery pack together with a processor that is used to control the operation of the secondary battery. In the related art, a charging device is connected to a charging terminal of a battery pack, and cells of the battery pack are charged by electricity supplied through a high current path.

In this case, when a battery which is built in (or non-removably attached to) an electronic device is charged or a battery is charged in a state in which the battery is attached to an electronic device, electricity supplied for charging the battery may affect the electronic device and may cause unexpected behaviors or malfunction of the electronic device.

SUMMARY

Aspects of some embodiments are directed to a battery pack configured to prevent electrical connection between a load and a charging device in charging mode.

Aspects of some embodiments are directed to a battery pack configured to prevent electrical connection between a load and a charging device in discharging mode.

Aspects of some embodiments include a battery pack are directed to a processor that is generally used in battery packs such that costs for separating a charging path and a discharging path from each other may be reduced.

Additional aspects will be set forth in part in the description which follows and, in part, will be apparent from the description, or may be learned by practice of the presented embodiments of the disclosure.

According to some embodiments, there is provided a battery pack having a charging path and a discharging path separate from the charging path in at least a section, the battery pack including: a battery including at least one battery cell; a processor configured to monitor the battery and to control charging and discharging operations of the battery; a charging switch arranged along at least one of a first path electrically connecting a first pole of the battery to a charging device and a third path electrically connecting a second pole of the battery to the charging device, the charging switch being configured to operate according to a control signal generated by the processor; and a discharging switch arranged along at least one of a second path electrically connecting the first pole of the battery to a load and a fourth path electrically connecting the second pole of the battery to the load, the discharging switch being configured to operate according to the control signal generated by the processor.

In some embodiments, the charging switch is arranged along the first path and is configured to make or break electrical connection between the first pole of the battery and the charging device according to the control signal, and the discharging switch is arranged along the fourth path and is configured to make or break electrical connection between the second pole of the battery and the load according to the control signal.

In some embodiments, the battery pack further includes a discharging switch driver configured to control opening and closing of the discharging switch according to the control signal.

In some embodiments, when the battery pack is in a charging mode, the processor is configured to generate a control signal for closing the charging switch and opening the discharging switch and to transmit the control signal to the charging switch and the discharging switch driver.

In some embodiments, the battery pack further has a fifth path through which a path connecting the charging switch and the charging device to each other is electrically connected to the processor, and when the processor detects a set signal through the fifth path, the processor is configured to start the charging mode and to generate a control signal corresponding to the charging mode.

In some embodiments, when the battery pack is in the charging mode, the battery pack forms an electrically closed circuit that includes the battery and the charging device through first and third paths, and an electrically open circuit that includes the battery and the load through the second and fourth paths.

In some embodiments, when the battery pack is in a discharging mode, the processor generates a control signal for opening the charging switch and closing the discharging switch and transmits the control signal to the charging switch and the discharging switch driver.

In some embodiments, when the battery pack is in the discharging mode, the battery pack forms an electrically closed circuit that includes the battery and the load through the fourth path, and an electrically open circuit that includes the battery and the charging device through the first and third paths.

In some embodiments, the charging switch is arranged along the third path and is configured to make or break electrical connection between the second pole of the battery and the charging device according to the control signal, and the discharging switch is arranged along the second path and is configured to make or break electrical connection between the first pole of the battery and the load according to the control signal.

In some embodiments, the battery pack further includes a charging switch driver configured to control opening and closing of the charging switch according to the control signal.

In some embodiments, when the battery pack is in a charging mode, the processor generates a control signal for closing the charging switch and opening the discharging switch and transmits the control signal to the charging switch driver and the discharging switch.

In some embodiments, when the battery pack is in the charging mode, the battery pack forms an electrically closed circuit that includes the battery and the charging device through the first and third paths, and an electrically open circuit that includes the battery and the load through the second and fourth paths.

In some embodiments, when the battery pack is in a discharging mode, the processor is configured to generate a control signal for opening the charging switch and closing the discharging switch and to transmit the control signal to the charging switch driver and the discharging switch.

In some embodiments, when the battery pack is in the discharging mode, the battery pack forms an electrically closed circuit that includes the battery and the load through the second and fourth paths, and an electrically open circuit that includes the battery and the charging device through the first and third paths.

In some embodiments, the battery pack further includes: a short-circuit current breaker arranged along at least one of the first path and the third path.

According to some embodiments, there is provided an electronic device including: a battery pack that has a charging path and a discharging path separate from the charging path in at least a section, the battery pack being configured to supply electricity; and a circuit unit configured to operate by receiving electricity from the battery pack, wherein the battery pack includes: a battery including at least one battery cell; a processor configured to monitor the battery and to control charging and discharging operations of the battery; a charging switch arranged along at least one of a first path electrically connecting a first pole of the battery to a charging device and a third path electrically connecting a second pole of the battery to the charging device, the charging switch being configured to operate according to a control signal generated by the processor; and a discharging switch arranged along at least one of a second path electrically connecting the first pole of the battery to a load and a fourth path electrically connecting the second pole of the battery to the load, the discharging switch being configured to operate according to the control signal generated by the processor.

Other aspects, characteristics, and advantages will become apparent and more readily appreciated from the accompanying drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
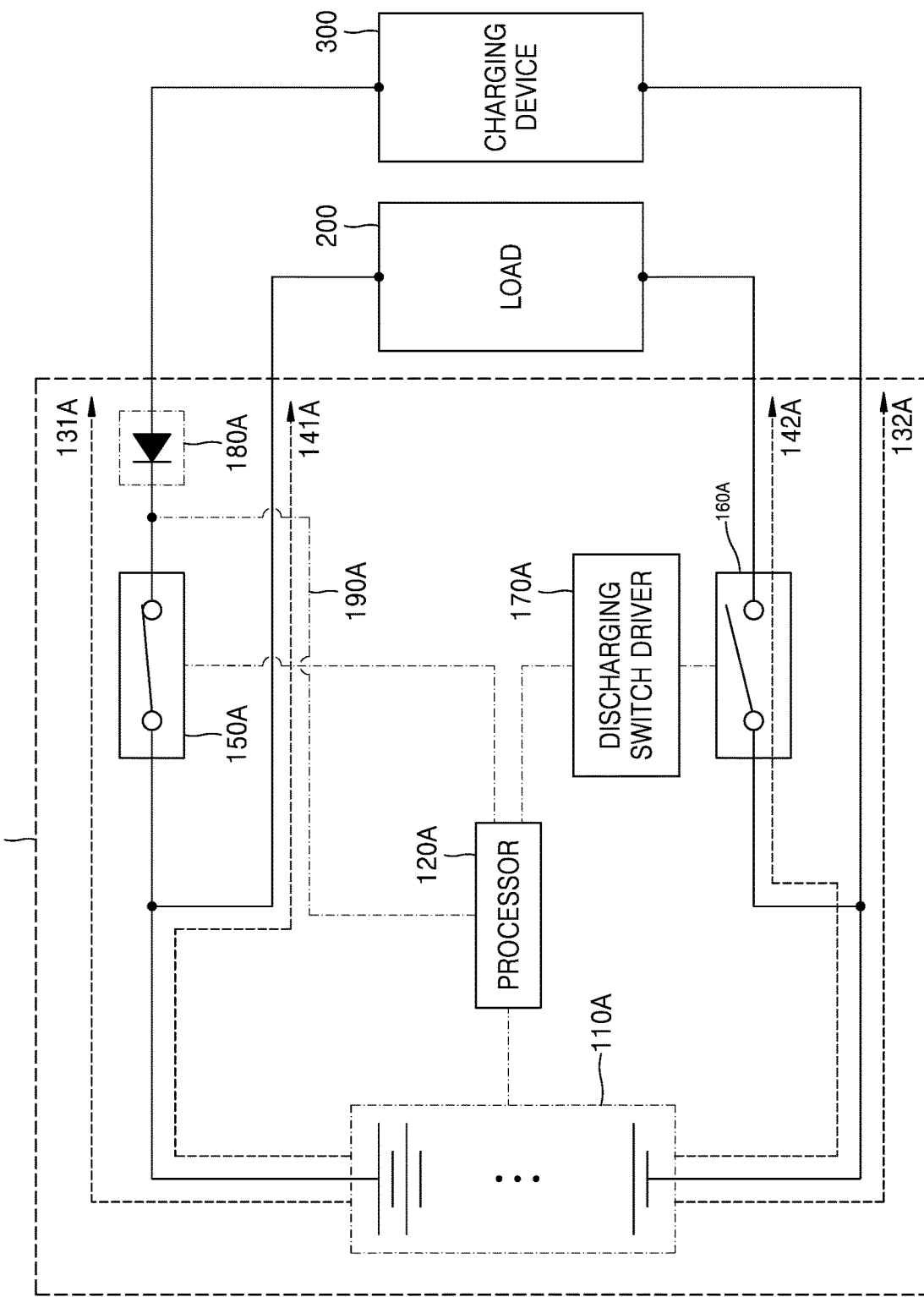
FIG. 1 illustrates a schematic structure of a charging system according to an example embodiment of the present disclosure.

Aspects and features of the present disclosure, and implementation methods thereof will be clarified through the following descriptions given with reference to the accompanying drawings. However, the following embodiments of the present disclosure are non-limiting examples and may have different forms, and it should be understood that the idea and technical scope of the present disclosure cover all the modifications, equivalents, and replacements. Rather, these embodiments are provided so that this disclosure will be thorough and complete, and will fully convey the scope of the present disclosure to those skilled in the art. Moreover, detailed descriptions related to well-known functions or configurations will be omitted in order not to unnecessarily obscure subject matters of the present disclosure.

For example, specific shapes, structures, and features described in one embodiment may be modified in another embodiment without departing from the scope of the present disclosure. In addition, the positions or arrangement of elements described in one embodiment may be changed in another embodiment within the scope of the present disclosure. That is, the following description is provided for illustrative purposes only and is not intended to limit the scope of the present disclosure. The scope of the present disclosure is defined by the claims and equivalents thereof. In the drawings, similar or identical elements in many aspects are denoted with the same reference numbers. Details described in the present disclosure are examples. That is, such details may be changed in other embodiments within the spirit and scope of the present disclosure.

Hereinafter, embodiments will be described in detail with reference to the accompanying drawings. In the drawings, identical or corresponding elements are denoted with the same reference numbers, and overlapping descriptions thereof will be omitted.

FIG. 1 illustrates a schematic structure of a charging system according to some embodiments.

Referring to FIG. 1, the charging system according to some embodiments may include a battery pack 100A, a load 200 that may be driven by the battery pack 100A, and a charging device 300 configured to charge the battery pack 100A.

Figure 5:
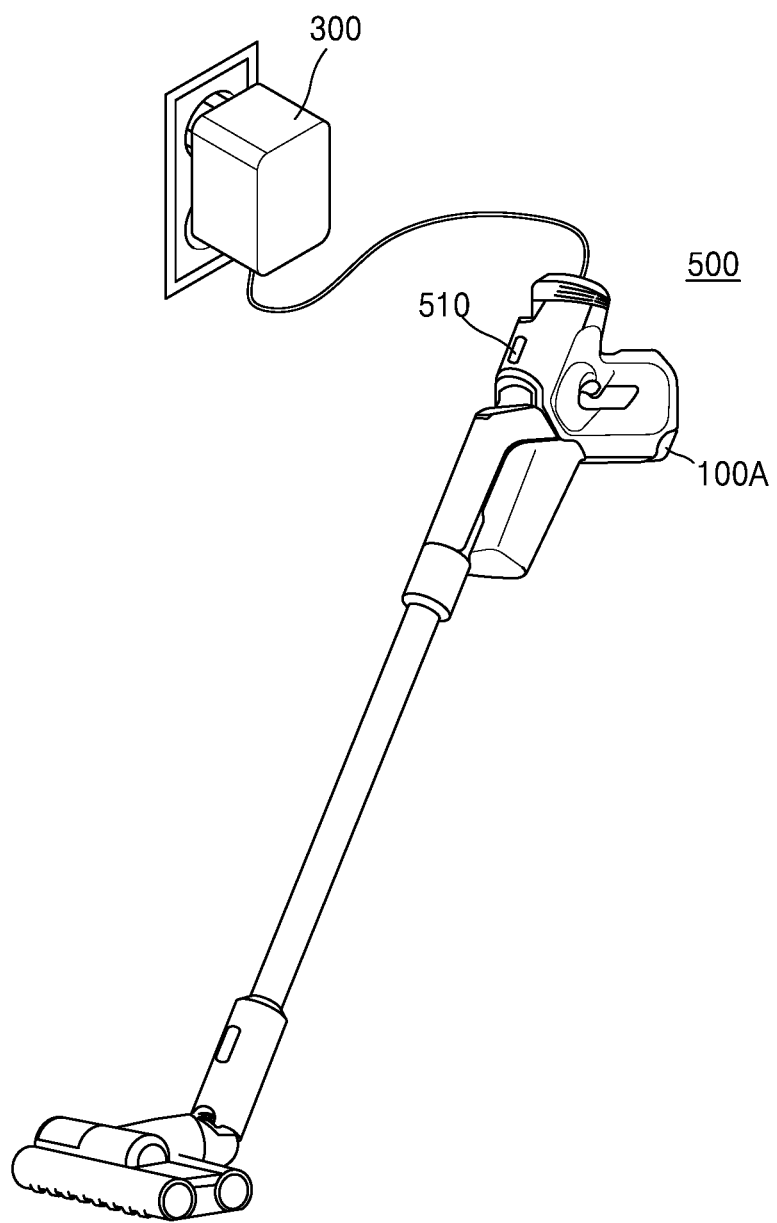
FIG. 5 illustrates an example of an electronic device according to an example embodiment of the present disclosure.

In the present disclosure, the load 200 may refer to any type of electronic device that operates by receiving electricity from the battery pack 100A. For example, when the battery pack 100A is used in a cleaner 500 as shown in FIG. 5, the load 200 may be a main body 510 or a circuit unit of the cleaner 500. In addition, when the battery pack 100A is used in a portable terminal, the load 200 may be a main body or a circuit unit of the portable terminal. In addition, when the battery pack 100A is used in an electric transportation mode such as an electric vehicle, the load 200 may be the electric transportation mode itself or a circuit unit of the electric transportation mode. As described above, in the present disclosure, the load 200 may, in spite of its name, refer to any electronic device that is driven by electricity supplied from the battery pack 100A.

In the present disclosure, the charging device 300 may be a device configured to charge a battery 110A of the battery pack 100A by supplying charging current and/or charging voltage to the battery pack 100A in a given manner. For example, when the battery pack 100A is used in the cleaner 500 as in the above-described example, the charging device 300 may be a device configured to supply electricity for charging the cleaner 500 as shown in FIG. 5.

In the present disclosure, the battery pack 100A may refer to a device that supplies electricity to the load 200 or stores electricity obtained from the charging device 300. The battery pack 100A according to some embodiments has a charging path and a discharging path which is separate from the charging path in at least a section, such that when the battery pack 100A is charged, no additional measurements may be required to release electrical connection between the load 200 and the charging device 300.

The battery pack 100A according to some embodiments may include the battery 110A, a processor 120A, a first path 131A, a second path 141A, a third path 132A, a fourth path 142A, a charging switch 150A, a discharging switch 160A, a discharging switch driver 170A, a short-circuit current breaker 180A, and a fifth path 190A.

The battery 110A according to some embodiments may be a device configured to receive electricity from the charging device 300 and store the electricity, or output stored electricity to the load 200, and may include one or more battery cells. The battery cells may be connected in series, parallel, or series-parallel (i.e., a mix of series and parallel configurations). The number of battery cells included in the battery 110A and the method of connecting the battery cells of the battery 110A may be determined according to a required output voltage and a required electricity storage capacity.

The battery cells may include rechargeable secondary battery cells. For example, the battery cells may include nickel-cadmium battery cells, lead battery cells, nickel metal hydride (NiMH) battery cells, lithium-ion battery cells, lithium polymer battery cells, or the like, but are not limited thereto.

According to some embodiments, the processor 120A may be a device configured to manage the battery 110A. For example, the processor 120A may monitor the voltage and/or current of the battery 110A to check whether the battery 110A is abnormal, or may control the charging switch 150A and/or the discharging switch 160A after checking whether to start charging. For example, the processor 120A may refer to a battery management system (BMS) and/or a battery integrated circuit (IC).

The processor 120A according to some embodiments may control the charging current and/or discharging current of the battery pack 100A. For example, the processor 120A may have functions such as overcharge protection, overdischarge protection, overcurrent protection, overvoltage protection, overheat protection, or cell balancing.

The processor 120A may measure states of the battery 110A such as the current, voltage, temperature, remaining electricity, lifespan, or state of charge (SOC) of the battery 110A. For example, the processor 120A may measure the voltages and temperatures of the battery cells by using sensors.

The processor 120A according to some embodiments may include any kind of device capable of processing data. For example, the processor 120A according to some embodiments may refer to a data processing device embedded in hardware having a physically structured circuit for performing a function represented by codes or instructions included in a program.

Examples of the data processing device embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The processor 120A according to some embodiments may be a BMS for controlling a charging switch and a discharging switch that are arranged on the same high current path. For example, the processor 120A according to some embodiments may be a BMS configured to control a charging switch and a discharging switch that are arranged on an H-side.

In some embodiments, the first path 131A may electrically connect a first pole of the battery 110A and the charging device 300 to each other, and the second path 141A may electrically connect the first pole of the battery 110A and the load 200 to each other.

In addition, according to some embodiments, the third path 132A may electrically connect a second pole of the battery 110A and the charging device 300 to each other, and the fourth path 142A may electrically connect the second pole of the bare cell 110 and the load 200 to each other.

In the present disclosure, the term "path" may refer to a conductive line that electrically connects two points. Therefore, the first path 131A may be a conductive line that electrically connects a positive pole of the battery 110A and a charging terminal of the charging device 300 to each other, and the second path 141A may be a conductive line that connects the positive pole of the battery 110A and a terminal of the load 200 to each other.

In addition, the first path 131A and the second path 141A may share a path in at least a section. For example, as illustrated in FIG. 1, the first path 131A and the second path 141A may share a path from the positive pole of the battery 110A to a certain point. Similarly, the third path 132A and the fourth path 142A may share at least a section of a path.

In some embodiments, the charging switch 150A may perform an operation for charging the battery 110A under the control of the processor 120A. For example, when the battery pack 100A is in a charging mode, the charging switch 150A may be closed under the control of the processor 120A to bring the first path 131A into a closed state.

In other words, the charging switch 150A may be arranged on the first path 131A to make or break electrical connection between the first pole of the battery 110A and the charging device 300 according to a control signal generated by the processor 120A.

The charging switch 150A according to some embodiments may be implemented with one of a field effect transistor (FET), a bipolar junction transistor (BJT), an insulated gate bipolar mode transistor (IGBT), and a relay. However, this is an example, and embodiments of the present disclosure are not limited thereto.

In the present disclosure, "closing" a switch may refer to turning the switch on to electrically connect two points connected through the switch. Conversely, in the present disclosure, "opening" a switch may refer to turning the switch off to electrically disconnect two points connected through the switch.

In some embodiments, the discharging switch 160A may perform an operation for discharging the battery 110A under the control of the processor 120A. For example, when the battery pack 100A is in a discharging mode (that is, a mode for driving the load 200), the discharging switch 160A may be closed under the control of the processor 120A to bring the fourth path 142A into a closed state.

In other words, the discharging switch 160A may be arranged on the fourth path 142A to make or break electrical connection between the second pole of the battery 110A and the load 200 according to a control signal generated by the processor 120A.

In some embodiments, as with the charging switch 150A, the discharging switch 160A may be implemented with one of a field effect transistor (FET), a bipolar junction transistor (BJT), an insulated gate bipolar mode transistor (IGBT), and a relay. However, this is an example, and embodiments of the present disclosure are not limited thereto.

The discharging switch driver 170A according to some embodiments may refer to a device configured to control opening and closing of the discharging switch 160A according to a control signal generated by the processor 120A.

As described above, the processor 120A according to some embodiments may be a BMS for controlling a charging switch and a discharging switch that are arranged on the same high current path. Since the processor 120A is generally designed based on the premise that a charging switch and a discharging switch are arranged on the same side (e.g., a high-current side or an H-side), the processor 120A may not be suitable for controlling the discharging switch 160A when the charging switch 150A and the discharging switch 160A are respectively on the H-side and an L-side (i.e., low current side), as shown in FIG. 1.

In some embodiments, therefore, the discharging switch driver 170A may control opening and closing of the discharging switch 160A according to a control signal when the control signal is generated by the processor 120A under the premise that the discharging switch 160A is on the H-side as with the charging switch 150A, or when the control signal is separately generated by the processor 120A (and, e.g., output through an I/O port of the processor 120A).

For example, the discharging switch driver 170A may control opening and closing of the discharging switch 160A by leveling down a control signal when the control signal is generated by the processor 120A on the premise that both the discharging switch 160A and the charging switch 150A are on the same H-side. In addition, the discharging switch driver 170A may control opening and closing of the discharging switch 160A based on a control signal separately output from the processor 120A through an I/O port.

The short-circuit current breaker 180A according to some embodiments may be a device configured to prevent short-circuit current from flowing in the battery pack 100A when the charging device 300 is short circuited. The short-circuit current breaker 180A may include a device such as a diode that unidirectionally passes current, as shown in FIG. 1.

In some embodiments, the fifth path 190A may be a path for detecting whether the charging device 300 is connected to the battery pack 100A. For example, as illustrated in FIG. 1, the fifth path 190A may be a path through which a path connecting the charging switch 150A and the charging device 300 to each other is electrically connected to the processor 120A, and the fifth path 190A may be used to detect a connection signal (e.g., a voltage or current signal) when the charging device 300 is connected to the battery pack 100A.

When a set or predetermined signal is detected through the fifth path 190A, the processor 120A according to some embodiments may start the charging mode.

Figure 2:
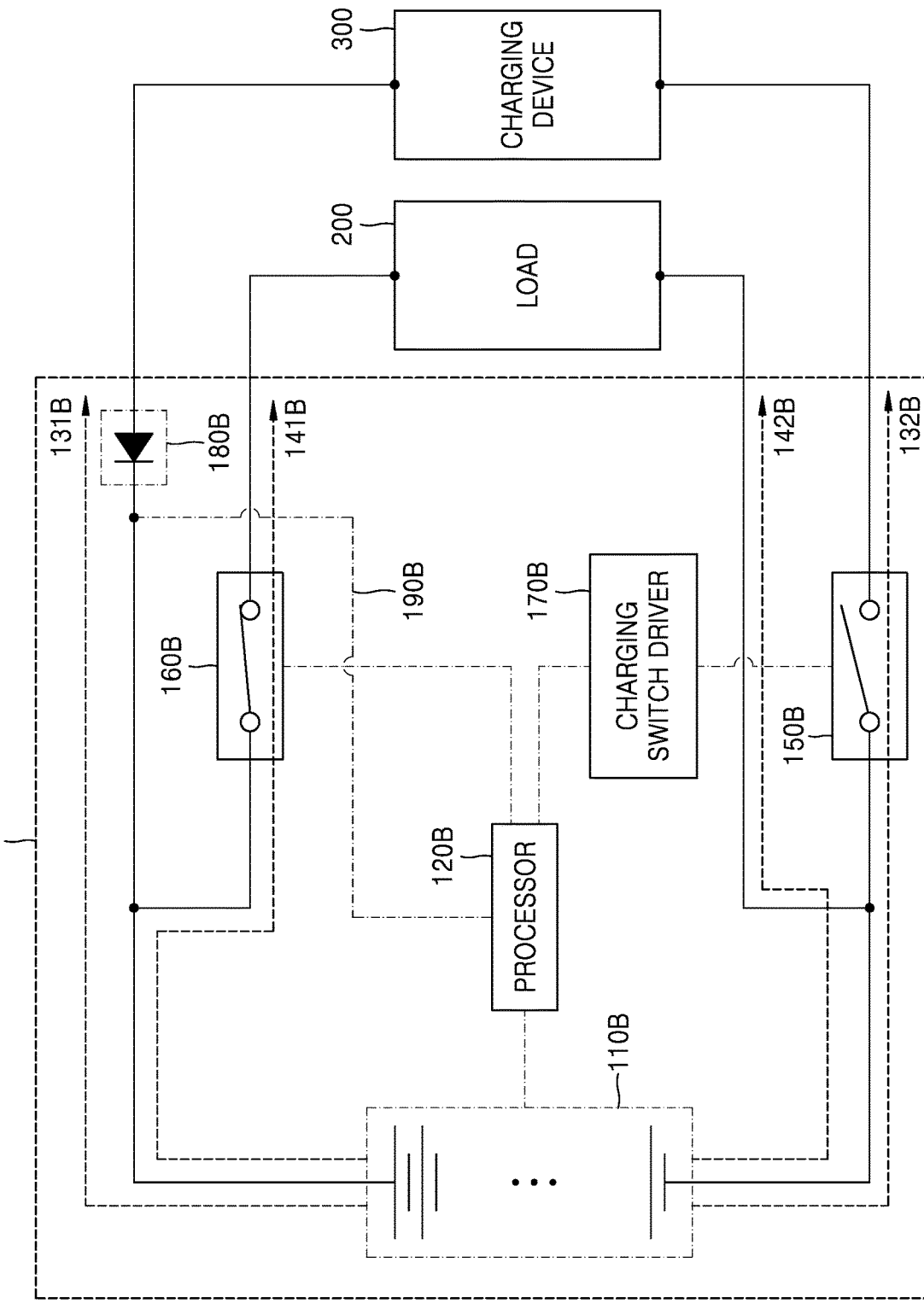
FIG. 2 illustrates a schematic structure of a charging system according to another example embodiment of the present disclosure.

FIG. 2 illustrates a schematic structure of a charging system according to another embodiment.

Similar to the charging system shown in FIG. 1, the charging system of the present embodiment may include a battery pack 100B, a load 200 that may be driven by the battery pack 100B, and a charging device 300 configured to charge the battery pack 100B.

The load 200 and the charging device 300 of the present embodiment are the same as the load 200 and the charging device 300 of the charging system shown in FIG. 1, and thus detailed descriptions thereof may not be presented here.

In addition, the battery pack 100B of the present embodiment may include a battery 110B, a processor 120B, a first path 131B, a second path 141B, a third path 132B, a fourth path 142B, a charging switch 150B, a discharging switch 160B, a charging switch driver 170B, a short-circuit current breaker 180B, and a fifth path 190B.

The battery pack 100B of the present embodiment is the same as the battery pack 100A described with reference to FIG. 1 except for the positions of the charging switch 150B and the discharging switch 160B and the configuration of the charging switch driver 170B. Thus, the differences will be mainly described, and the same structures may not be described here.

The discharging switch 160B of the present embodiment may perform an operation for discharging the battery 110B under the control of the processor 120B. In this case, the discharging switch 160B of the present embodiment may be arranged on the second path 141B.

When the battery pack 100B is in a discharging mode (i.e., a mode for driving the load 200), the discharging switch 160B may be closed under the control of the processor 120B to bring the second path 141B into a closed state.

In other words, the discharging switch 160B may be arranged on the second path 141B to make or break electrical connection between a first pole of the battery 110B and the load 200 according to a control signal generated by the processor 120B.

The discharging switch 160B of the present embodiment may be implemented with one of a field effect transistor (FET), a bipolar junction transistor (BJT), an insulated gate bipolar mode transistor (IGBT), and a relay. However, this is an example, and embodiments of the present disclosure are not limited thereto.

In the present embodiment, the charging switch 150B may perform an operation for charging the battery 110B under the control of the processor 120B. In this case, the charging switch 150B of the present embodiment may be arranged on the third path 132B.

When the battery pack 100B is in a charging mode, the charging switch 150B may be closed under the control of the processor 120B to bring the third path 132B into a closed state.

In other words, the charging switch 150B may be arranged on the third path 132B to make or break electrical connection between a second pole of the battery 110B and the charging device 300 according to a control signal generated by the processor 120B.

The charging switch 150B of the present embodiment may be implemented with one of a field effect transistor (FET), a bipolar junction transistor (BJT), an insulated gate bipolar mode transistor (IGBT), and a relay. However, this is an example, and embodiments of the present disclosure are not limited thereto.

The charging switch driver 170B of the present embodiment may refer to a device configured to control opening and closing of the charging switch 150B according to a control signal generated by the processor 120B.

As described above, the processor 120B of the present embodiment may be a BMS for controlling a charging switch and a discharging switch that are arranged on the same high current path. Since the processor 120B is based on the premise that a charging switch and a discharging switch are arranged on the same side (e.g., an H-side), the processor 120B may not be suitable for controlling the charging switch 150B when the discharging switch 160B and the charging switch 150B are respectively on an H-side and an L-side, as shown in FIG. 2.

In the present embodiment, therefore, the charging switch driver 170B may control opening and closing of the charging switch 150B according to a control signal when the control signal is generated by the processor 120B under the premise that both the charging switch 150B and the discharging switch 160B are on the same H-side, or when the control signal is separately generated by the processor 120B (and, e.g., output through an I/O port of the processor 120A).

For example, the charging switch driver 170A may control opening and closing of the charging switch 150B by leveling down a control signal when the control signal is generated by the processor 120B on the premise that both the charging switch 150B and the discharging switch 160B are on the same H-side. In addition, the charging switch driver 170A may control opening and closing of the charging switch 150B based on a control signal separately output from the processor 120B through an I/O port.

Figure 3:
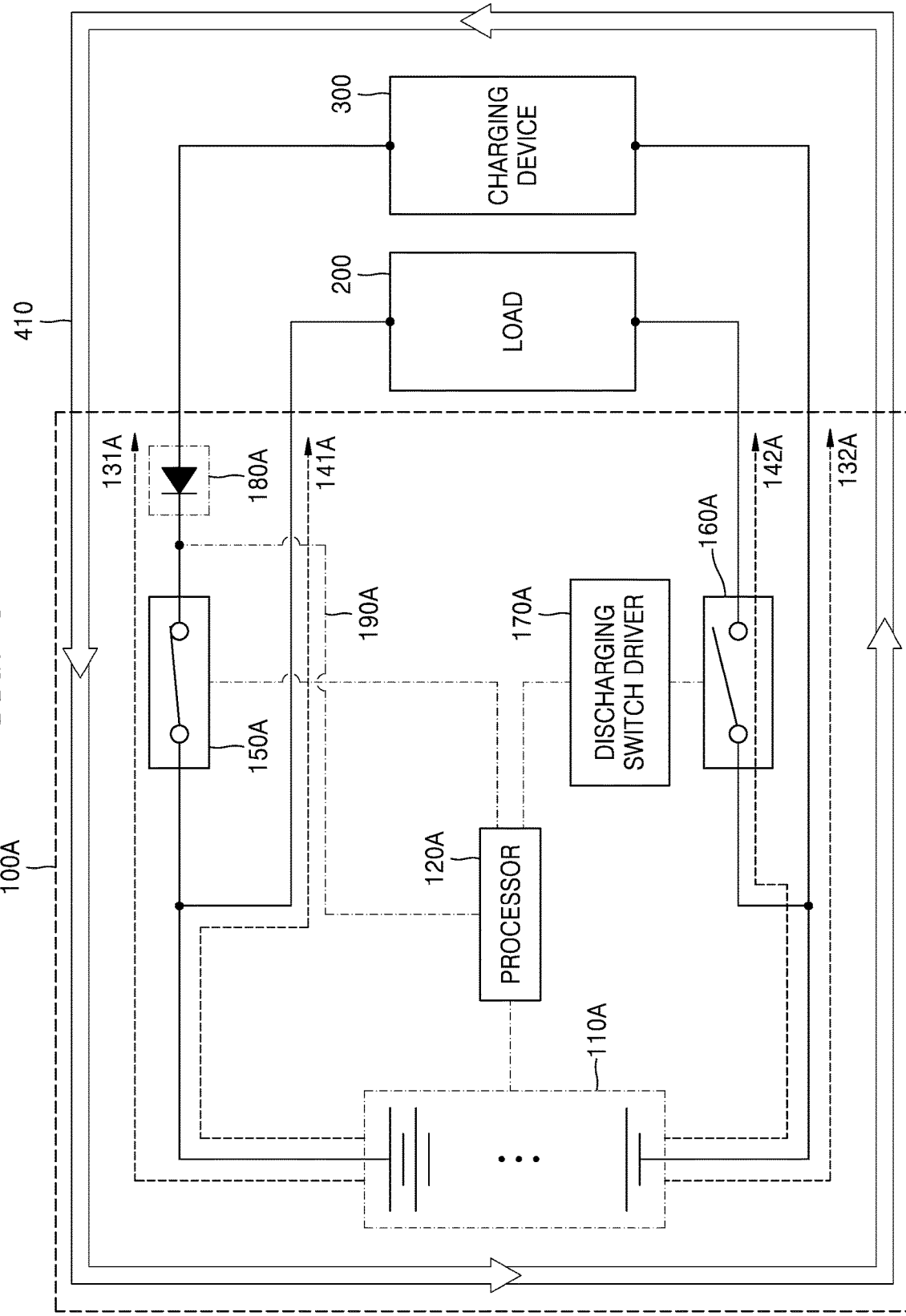
FIG. 3 illustrates an operation of a charging system in a charging mode according to an example embodiment of the present disclosure.

FIG. 3 illustrates an operation of a charging system in a charging mode according to some embodiments. For ease of illustration, the operation in the charging mode will be described based on the charging system described with reference to FIG. 1.

As described above, in some embodiments, when a set or predetermined signal is detected through the fifth path 190A, the processor 120A may start the charging mode.

In the charging mode, the processor 120A according to some embodiments may generate a control signal for closing the charging switch 150A and opening the discharging switch 160A and may transmit the control signal to the charging switch 150A and the discharging switch driver 170A.

Then, the battery pack 100A according to some embodiments may form an electrically closed circuit 410 that includes the battery 110A, the third path 132A, the charging device 300, and the first path 131A.

In addition, the battery pack 100A may also form an electrically open circuit that includes the battery 110A, the second path 141A, the load 200, and the fourth path 142A.

As described above, according to the present disclosure, the path for discharging is opened as an open circuit in the charging mode, thereby preventing electrical connection between the charging device 300 and the load 200 in the charging mode.

Figure 4:
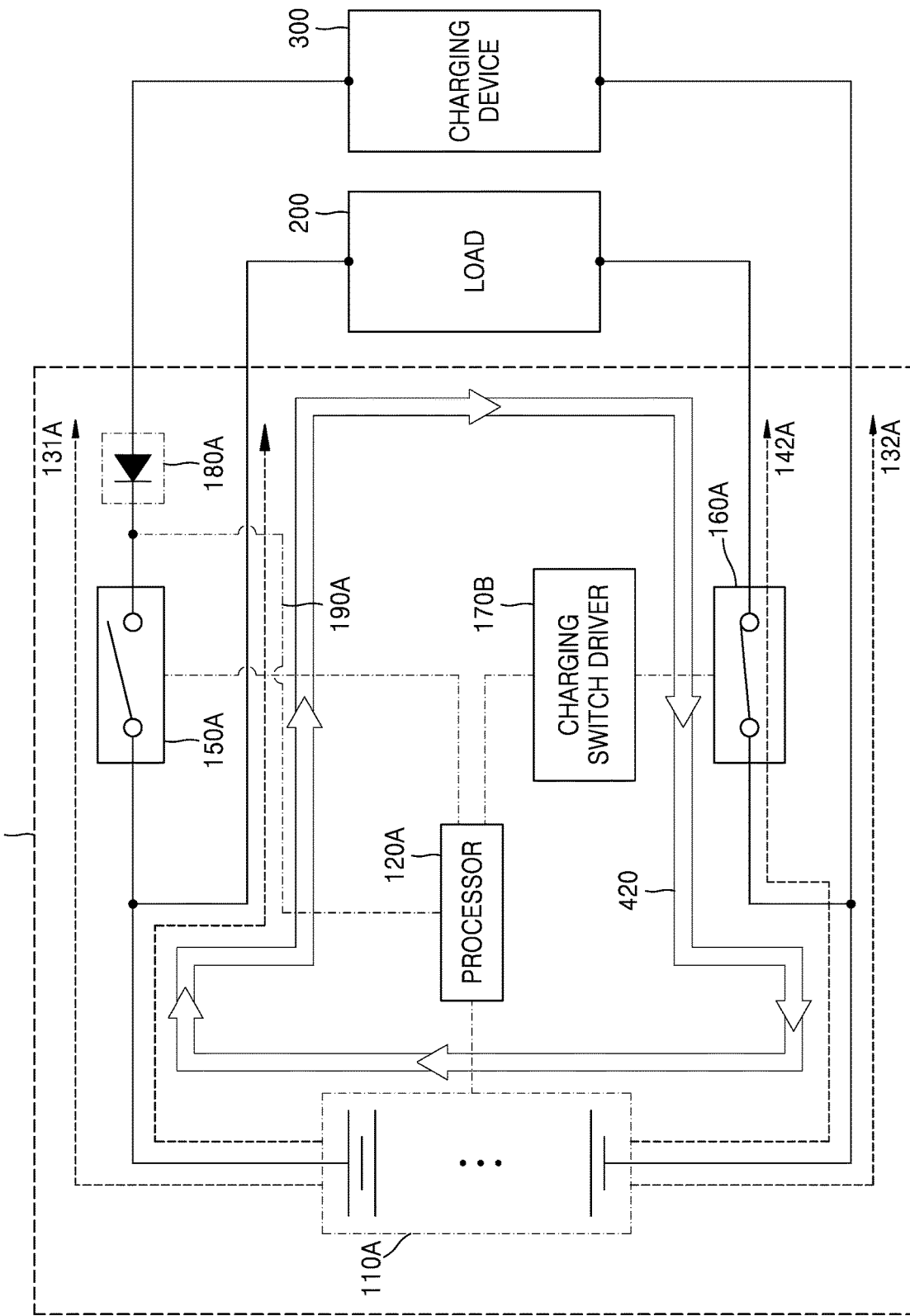
FIG. 4 illustrates an operation of a charging system in a discharging mode according to an example embodiment of the present disclosure.

FIG. 4 illustrates an operation of a charging system in a discharging mode according to some embodiments. As in the description provided above with reference to FIG. 3, the operation in the discharging mode will be described based on the charging system shown in FIG. 1.

According to the present embodiment, in the discharging mode, the processor 120A may generate a control signal for opening the charging switch 150A and closing the discharging switch 160A and may transmit the control signal to the charging switch 150A and the discharging switch driver 170A.

Then, the battery pack 100A according to some embodiments may form an electrically closed circuit 420 that includes the battery 110A, the second path 141A, the load 200, and the fourth path 142A.

In addition, the battery pack 100A may also form an electrically open circuit that includes the battery 110A, the third path 132A, the charging device 300, and the first path 131A.

As described above, according to the present disclosure, the path for charging is opened as an open circuit in the discharging mode, thereby preventing electrical connection between the charging device 300 and the load 200 in the discharging mode.

The above-described operations or embodiments are examples which are not intended to limit the scope of the present disclosure. For clarity of description, electronic configurations, control systems, and software of the related art, and other functional aspects of the systems may not be described. Furthermore, line connections or connection members between elements depicted in the drawings represent functional connections and/or physical or circuit connections by way of example, and in actual applications, they may be replaced or embodied with various suitable additional functional connections, physical connections, or circuit connections. Elements described without using terms such as "essential" and "important" may not be necessary for implementing the inventive concept.

As described above, according to the one or more of the above embodiments, the load and the charging device may not be electrically connected to each other both in the charging mode and the discharging mode.

In addition, since the battery pack uses a processor that is generally used in battery packs, costs for separating the charging path and the discharging path from each other may be reduced.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "use," "using," and "used" may be considered synonymous with the terms "utilize," "utilizing," and "utilized," respectively.

The battery pack and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the battery pack may be formed on one integrated circuit (IC) chip or on separate IC chips. Further, the various components of the battery pack may be implemented on a flexible printed circuit film, a tape carrier package (TCP), a printed circuit board (PCB), or formed on a same substrate. Further, the various components of the battery pack may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various suitable changes in form and details may be made therein without departing from the spirit and scope of the present disclosure as defined by the following claims and equivalents thereof.

What is claimed is:

1. A battery pack having a charging path and a discharging path separate from the charging path in at least a section, the battery pack comprising:
   a battery comprising at least one battery cell;
   a processor configured to monitor the battery and to control charging and discharging operations of the battery;
   a charging switch arranged along at least one of a first path electrically connecting a first pole of the battery to a charging device and a third path electrically connecting a second pole of the battery to the charging device, the charging switch being configured to operate according to a control signal generated by the processor; and
   a discharging switch arranged along at least one of a second path electrically connecting the first pole of the battery to a load and a fourth path electrically connecting the second pole of the battery to the load, the discharging switch being configured to operate according to the control signal generated by the processor,
   wherein the processor is configured to close one of the charging switch and the discharging switch and concurrently open another one of the charging switch and the discharging switch.

2. The battery pack of claim 1, wherein the charging switch is arranged along the first path and is configured to make or break electrical connection between the first pole of the battery and the charging device according to the control signal, and the discharging switch is arranged along the fourth path and is configured to make or break electrical connection between the second pole of the battery and the load according to the control signal.

3. The battery pack of claim 2, further comprising:
   a discharging switch driver configured to control opening and closing of the discharging switch according to the control signal.

4. The battery pack of claim 3, wherein, when the battery pack is in a charging mode, the processor is configured to generate a control signal for closing the charging switch and opening the discharging switch and to transmit the control signal to the charging switch and the discharging switch driver.

5. The battery pack of claim 4, wherein the battery pack further has a fifth path through which a path connecting the charging switch and the charging device to each other is electrically connected to the processor, and
   wherein, when the processor detects a set signal through the fifth path, the processor is configured to start the charging mode and to generate a control signal corresponding to the charging mode.

6. The battery pack of claim 4, wherein, when the battery pack is in the charging mode, the battery pack forms an electrically closed circuit that comprises the battery and the charging device through first and third paths, and an electrically open circuit that comprises the battery and the load through the second and fourth paths.

7. The battery pack of claim 3, wherein, when the battery pack is in a discharging mode, the processor generates a control signal for opening the charging switch and closing the discharging switch and transmits the control signal to the charging switch and the discharging switch driver.

8. The battery pack of claim 7, wherein, when the battery pack is in the discharging mode, the battery pack forms an electrically closed circuit that comprises the battery and the load through the fourth path, and an electrically open circuit that comprises the battery and the charging device through the first and third paths.

9. The battery pack of claim 1, wherein the charging switch is arranged along the third path and is configured to make or break electrical connection between the second pole of the battery and the charging device according to the control signal, and the discharging switch is arranged along the second path and is configured to make or break electrical connection between the first pole of the battery and the load according to the control signal.

10. The battery pack of claim 9, further comprising:
    a charging switch driver configured to control opening and closing of the charging switch according to the control signal.

11. The battery pack of claim 10, wherein, when the battery pack is in a charging mode, the processor generates a control signal for closing the charging switch and opening the discharging switch and transmits the control signal to the charging switch driver and the discharging switch.

12. The battery pack of claim 11, wherein, when the battery pack is in the charging mode, the battery pack forms an electrically closed circuit that comprises the battery and the charging device through the first and third paths, and an electrically open circuit that comprises the battery and the load through the second and fourth paths.

13. The battery pack of claim 10, wherein, when the battery pack is in a discharging mode, the processor is configured to generate a control signal for opening the charging switch and closing the discharging switch and to transmit the control signal to the charging switch driver and the discharging switch.

14. The battery pack of claim 13, wherein, when the battery pack is in the discharging mode, the battery pack forms an electrically closed circuit that comprises the battery and the load through the second and fourth paths, and an electrically open circuit that comprises the battery and the charging device through the first and third paths.

15. The battery pack of claim 1, further comprising:
a short-circuit current breaker arranged along at least one of the first path and the third path.

16. An electronic device comprising:
a battery pack that has a charging path and a discharging path separate from the charging path in at least a section, the battery pack being configured to supply electricity; and
a circuit unit configured to operate by receiving electricity from the battery pack,
wherein the battery pack comprises:
a battery comprising at least one battery cell;
a processor configured to monitor the battery and to control charging and discharging operations of the battery;
a charging switch arranged along at least one of a first path electrically connecting a first pole of the battery to a charging device and a third path electrically connecting a second pole of the battery to the charging device, the charging switch being configured to operate according to a control signal generated by the processor; and
a discharging switch arranged along at least one of a second path electrically connecting the first pole of the battery to a load and a fourth path electrically connecting the second pole of the battery to the load, the discharging switch being configured to operate according to the control signal generated by the processor,
wherein the processor is configured to close one of the charging switch and the discharging switch and concurrently open another one of the charging switch and the discharging switch.

* * * * *